(12) United States Patent
Kang et al.

(10) Patent No.: US 12,534,343 B2
(45) Date of Patent: Jan. 27, 2026

(54) INTER-FLOOR TRANSPORT SYSTEM

(71) Applicant: SAMSUNG ELECTRONICS CO., LTD., Suwon-si (KR)

(72) Inventors: Seunggyu Kang, Suwon-si (KR); Hyunjae Kang, Suwon-si (KR); Sangmin Kim, Suwon-si (KR); Youngwook Kim, Suwon-si (KR); Yong-Jun Ahn, Suwon-si (KR); Min Kyun Lee, Suwon-si (KR); Sangkyung Lee, Suwon-si (KR); Hyunwoo Lee, Suwon-si (KR); Jeonghun Lim, Suwon-si (KR); Junhyuk Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 18/511,580

(22) Filed: Nov. 16, 2023

(65) Prior Publication Data
US 2024/0327168 A1    Oct. 3, 2024

(30) Foreign Application Priority Data
Mar. 28, 2023 (KR) .................. 10-2023-0040375

(51) Int. Cl.
| | | |
|---|---|---|
| *B66B 11/04* | (2006.01) | |
| *B60L 9/24* | (2006.01) | |
| *B64U 10/14* | (2023.01) | |
| *B64U 30/297* | (2023.01) | |

(Continued)

(52) U.S. Cl.
CPC ............ *B66B 11/0407* (2013.01); *B60L 9/24* (2013.01); *B64U 10/14* (2023.01); *B64U 30/297* (2023.01); *B64U 50/35* (2023.01); *B66B 7/04* (2013.01); *B66B 9/003* (2013.01); *B66B 11/0226* (2013.01); *B66B 11/043* (2013.01); *B64U 2101/61* (2023.01); *B64U 2101/70* (2023.01)

(58) Field of Classification Search
CPC ................ B64U 50/35; B64U 2101/61; B64U 2101/70; B64U 50/34; B64U 2101/60; B64C 39/024; B66B 7/04; B66B 9/003; H01L 21/67715; H01L 21/67259; H01L 21/67733
See application file for complete search history.

(56) References Cited

U.S. PATENT DOCUMENTS 3,774,542 A * 11/1973 Walsh ................... B61C 11/06
                                                    104/93
8,444,515 B2    5/2013 Baranda et al.
(Continued)

FOREIGN PATENT DOCUMENTS

| JP | 6887874 B2 | 6/2021 |
|---|---|---|
| JP | 2022-109352 A | 7/2022 |

(Continued)

*Primary Examiner* — Joshua J Michener
*Assistant Examiner* — Cindi M Curry
(74) *Attorney, Agent, or Firm* — Sughrue Mion, PLLC

(57) ABSTRACT

An inter-floor transport system includes an aerial vehicle configured to move vertically and horizontally along a passage and a power assembly including a power supply adjacent to the passage and a guide cable extending along the passage and connected to the power supply, where the aerial vehicle is configured to receive power through the guide cable without contacting the guide cable.

20 Claims, 13 Drawing Sheets

(51) Int. Cl.
*B64U 50/35* (2023.01)
*B64U 101/61* (2023.01)
*B64U 101/70* (2023.01)
*B66B 7/04* (2006.01)
*B66B 9/00* (2006.01)
*B66B 11/02* (2006.01)

(56) References Cited

U.S. PATENT DOCUMENTS

| | | |
|---|---|---|
| 9,546,447 B2 | 1/2017 | Wesson et al. |
| 10,822,080 B2 | 11/2020 | Kirkbride |
| 10,906,775 B2 | 2/2021 | Schoenauer |
| 2016/0229646 A1* | 8/2016 | Bambrogan ............ B66C 25/00 |
| 2017/0107080 A1 | 4/2017 | Steinhauer |
| 2017/0175413 A1* | 6/2017 | Curlander ................ B64F 1/10 |
| 2019/0135113 A1* | 5/2019 | Koo ....................... B60L 53/126 |
| 2019/0161319 A1* | 5/2019 | Miyajima ............. B66B 5/0025 |
| 2019/0383052 A1* | 12/2019 | Blake .................... B64U 80/40 |
| 2021/0387744 A1* | 12/2021 | Melamed ................ B64F 1/04 |
| 2022/0267096 A1* | 8/2022 | Baranger ............. G06V 10/141 |
| 2022/0274632 A1* | 9/2022 | Read ........................ B61B 3/02 |
| 2022/0306320 A1* | 9/2022 | Howe .................... B60L 53/16 |
| 2024/0076039 A1* | 3/2024 | Takahama .............. B64U 10/13 |

FOREIGN PATENT DOCUMENTS

| | | | |
|---|---|---|---|
| KR | 10-1891503 B1 | 8/2018 | |
| KR | 10-2020-0053737 A | 5/2020 | |
| KR | 10-2020-0073798 A | 6/2020 | |
| WO | WO-2022114241 A1 * | 6/2022 | ............... B61B 3/00 |

* cited by examiner

INTER-FLOOR TRANSPORT SYSTEM

CROSS-REFERENCE TO RELATED APPLICATION

This application is based on and claims priority to Korean Patent Application No. 10-2023-0040375, filed on Mar. 28, 2023, in the Korean Intellectual Property Office, the disclosure of which is incorporated herein by reference in its entirety.

BACKGROUND

1. Field

Example embodiments of the disclosure relate to an inter-floor transport system using an aerial vehicle.

2. Description of Related Art

As the production of semiconductors increases, the floor height of the fabrication facility (Fab) that produces semiconductors is increasing. Accordingly, the need for an inter-floor transport system capable of being implemented with high floor heights is increasing.

In the related art, a cable driving method may be used, but there is a limitation in the maximum installation height, and as such, it is difficult to access a high floor height above a specific height.

In addition, since the components are connected with a belt, there is a problem in that a plurality of boarding units cannot be arranged within a single passage.

Therefore, a new type of inter-floor transport system capable of securing price competitiveness, ease of installation and maintenance, while overcoming the problems of the existing type, is needed.

SUMMARY

One or more example embodiments of the disclosure provide an inter-floor transport system that may provide easy installation and maintenance and reducing costs.

Additional aspects will be set forth in part in the description which follows and, in part, will be apparent from the description, or may be learned by practice of the presented embodiments.

According to an aspect of an example embodiment, an inter-floor transport system may include an aerial vehicle configured to move vertically and horizontally along a passage and a power assembly including a power supply adjacent to the passage and a guide cable extending along the passage and connected to the power supply, where the aerial vehicle is configured to receive power through the guide cable without contacting the guide cable.

According to an aspect of an example embodiment, an inter-floor transport system may include a passage comprising a plurality of sub-passages extending vertically and being connected to each other, at least one aerial vehicle configured to move vertically and horizontally along the passage, and a power assembly including a power supply adjacent to the passage, and a guide cable extending along each of the plurality of sub-passages and connected to the power supply, where the at least one aerial vehicle is configured to receive power through the guide cable without contacting the guide cable.

According to an aspect of an example embodiment, an inter-floor transport system may include a passage including a pair of sub-passages that extend vertically and are adjacent to each other and a connection passage extending horizontally and interconnecting the pair of sub-passages, a power assembly including a power supply connected to an external power source and disposed adjacent to the passage and a guide cable connected to the power supply and extending along each of the pair of sub-passages, and at least one aerial vehicle including a body including a loading space, a driver configured to move the body vertically and horizontally, a connection portion on a side of the body, the connection portion configured to contactlessly engage with the guide cable, receive power though the guide cable, and supply power to the driver, and a battery configured to supply auxiliary power to the driver, where the at least one aerial vehicle is configured to ascend and descend along a sub-passage of the pair of sub-passages using power from the guide cable and move between the pair of sub-passages using power from the battery.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
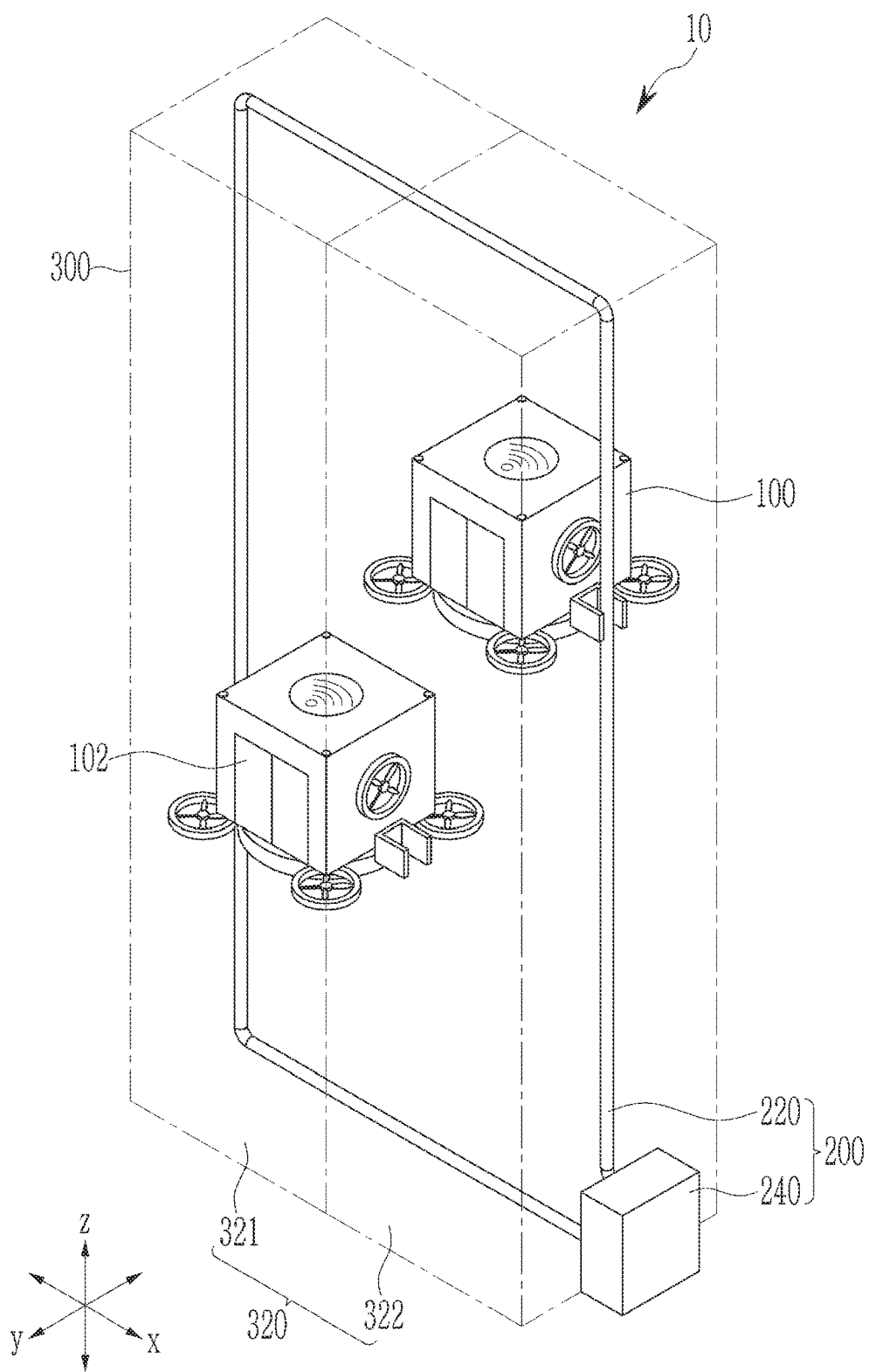
FIG. 1 is a perspective view illustrating an inter-floor transport system according to one or more embodiments.

Hereinafter, example embodiments of the present disclosure will be described with reference to the accompanying drawings. The described embodiments may be modified in various different ways, all without departing from the spirit or scope of the present disclosure.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present disclosure is not limited to the illustrated sizes and thicknesses.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

Further, throughout the specification, the phrase "in a plan view" means when an object portion is viewed from above, and the phrase "in a cross-sectional view" means when a cross-section taken by vertically cutting an object portion is viewed from the side.

Hereinafter, an inter-floor transport system according to embodiments is described with reference to the drawings.

Figure 2:
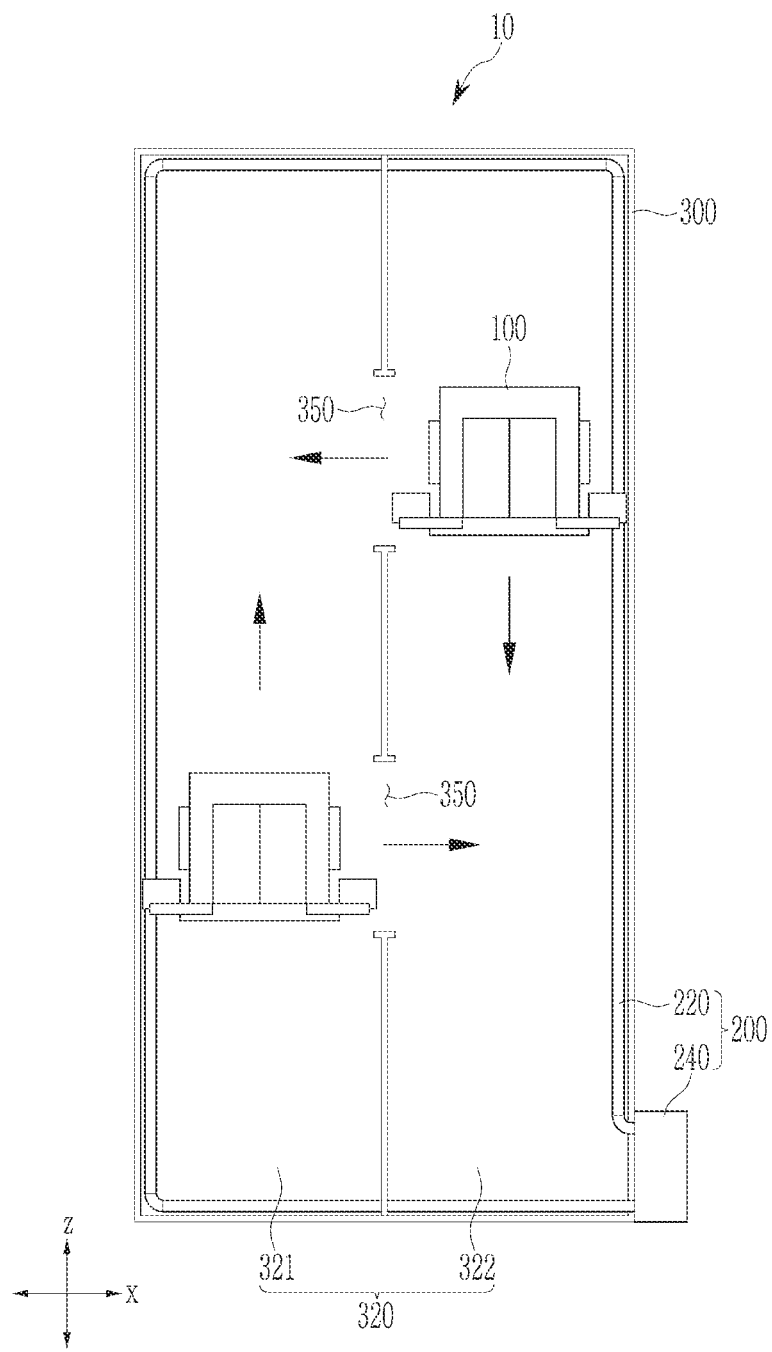
FIG. 2 is a front view illustrating an inter-floor transport system according to one or more embodiments.

FIG. 1 is a perspective view illustrating an inter-floor transport system according to one or more embodiments. FIG. 2 is a front view illustrating an inter-floor transport system according to one or more embodiments. For the convenience of understanding, the passage 300 is shown as dashed lines in FIG. 1.

Referring to FIG. 1 and FIG. 2, an inter-floor transport system 10 according to embodiments may be a system for transporting an object using an aerial vehicle 100 that moves (e.g., flies) along a passage 300. The aerial vehicle 100 may be configured to receive power through a contactless power assembly 200 in a contactless manner. Accordingly, an inter-floor transport system may be configured with an advantage of easy installation and maintenance. Hereinafter, a configuration of the inter-floor transport system 10 according to embodiments is described in detail.

Referring to FIG. 1 and FIG. 2, the inter-floor transport system 10 according to embodiments may include the aerial vehicle 100, the power assembly 200, and the passage 300.

The aerial vehicle 100 may move (e.g., fly) along the passage 300. According to an embodiment, the passage 300 may include a plurality of sub-passages 320 extending in a vertical direction (Z-direction in FIG. 1 and FIG. 2). For example, the plurality of sub-passages 320 may include a first sub-passage 321 and a second sub-passage 322.

Referring to FIG. 2, the first sub-passage 321 and the second sub-passage 322 may be connected to a connection passage 350 that extends in a horizontal direction (X-direction in FIG. 1 and FIG. 2). That is, the passage 300 may be formed to extend in the horizontal direction and the vertical direction.

FIG. 1 and FIG. 2 illustrate that one aerial vehicle 100 ascends and descends along respective sub-passages 321 and 322, but embodiments are not limited thereto. According to an embodiment, a plurality of aerial vehicles 100 may ascend and descend in respective sub-passages 321 and 322.

The aerial vehicle 100 may have a loading space 102 to be able to transport the object (which may also be referred to as a product, an item, and the like). For example, the aerial vehicle 100 may transport an object, such as a wafer, manufactured in a semiconductor manufacturing process, but is not limited thereto. Also, the aerial vehicle 100 may be loaded with a worker. At least one aerial vehicle 100 may be included in the inter-floor transport system 10 according to embodiments.

The aerial vehicle 100 may be provided with a door capable of being opened and closed, to protect objects stored therein. Accordingly, the objects being transported may be protected from being damaged during flight.

The aerial vehicle 100 may move along the passage 300. According to an embodiment, the aerial vehicle 100 may move (e.g., fly) vertically and horizontally. That is, the aerial vehicle 100 may be configured to be able to move (e.g., fly) vertically and horizontally. For example, the aerial vehicle 100 may include a driving device for the vertical flight and a driving device for horizontal flight.

According to an embodiment, the aerial vehicle 100 may receive power from the power assembly 200 in the contactless manner.

The power assembly 200 may include a power supply 240 and a guide cable 220. The guide cable 220 may be connected to the power supply 240. The guide cable 220 may extend along the passage 300. For example, the guide cable 220 may extend along an interior wall of the passage 300 along which the aerial vehicle 100 moves. For example, the guide cable 220 may extend along an interior wall of the sub-passage 320 extending in the vertical direction (the Z-direction).

When the aerial vehicle 100 moves along the passage 300, the aerial vehicle 100 may move along the guide cable 220. The aerial vehicle 100 may move in a state adjacent to the guide cable 220, and may maintain a state of being contactless to the guide cable 220 (i.e., the aerial vehicle 100 may be adjacent to the guide cable 220 and not contact the guide cable 220). The power may be supplied to the aerial vehicle 100 through the guide cable 220.

According to an embodiment, the aerial vehicle 100 may be supplied with power through the guide cable 220 without contacting the guide cable 220. The aerial vehicle 100 may move (e.g., fly) (i.e., move) along the passage 300, by being supplied with the power through the guide cable 220 in the contactless manner. For example, the aerial vehicle 100 may move (e.g., fly) in the vertical direction (ascend and descend) along the sub-passage 320, by being supplied with the power through the guide cable 220 in the contactless manner.

The aerial vehicle 100 may move in the horizontal direction. Referring to FIG. 2, the aerial vehicle 100 may move (e.g., fly) in the horizontal direction, through the connection passage 350 extending in the horizontal direction (the X-direction). The aerial vehicle 100 may separate or be distanced from the guide cable 220, and accordingly, may not receive power from the guide cable 220.

According to an embodiment, when the aerial vehicle 100 does not receive power from the guide cable 220, the aerial vehicle 100 may receive power from a battery 160 (FIG. 7) separately provided in the aerial vehicle 100. According to an embodiment, the aerial vehicle 100 may selectively receive power though the guide cable 220 or through the battery 160. For example, while moving (e.g., flying) vertically, the aerial vehicle 100 may receive power though the guide cable 220, and when moving (e.g., flying) horizontally, the aerial vehicle 100 may receive power by the battery 160.

The guide cable 220 may extend along each of the plurality of sub-passages 320. When the aerial vehicle 100 moves along the respective sub-passage 320, the guide cable 220 may supply power to the aerial vehicle 100.

The power assembly 200 may have a loop structure. Thus, installation and arrangement of the guide cable 220 constituting the power assembly 200 may be facilitated. In addition, as the power assembly 200 has the loop structure, power loss may be minimized and efficiency of the system may be enhanced.

For example, both ends of the guide cable 220 may be connected to the power supply 240. The power assembly 200 may have the loop structure in a single sub-passage 320. Alternatively, the power assembly 200 may have the loop structure over the plurality of sub-passages 320. Alternatively, the power assembly 200 may have a plurality of the loop structures in a single sub-passage 320.

Hereinafter, overall configurations and various embodiments of the aerial vehicle 100, the power assembly 200, and the passage 300 employed in the inter-floor transport system 10 according to embodiments are described in detail with reference to the drawings.

Figure 3:
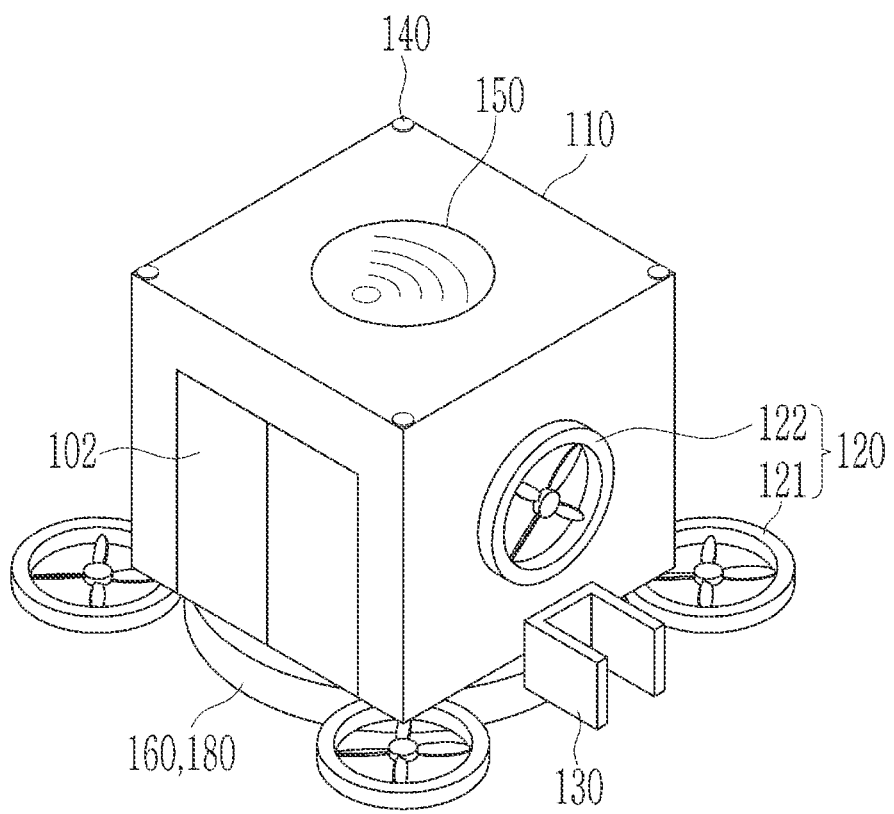
FIG. 3 is a diagram illustrating an aerial vehicle implemented in an inter-floor transport system according to one or more embodiments.
Figure 4:
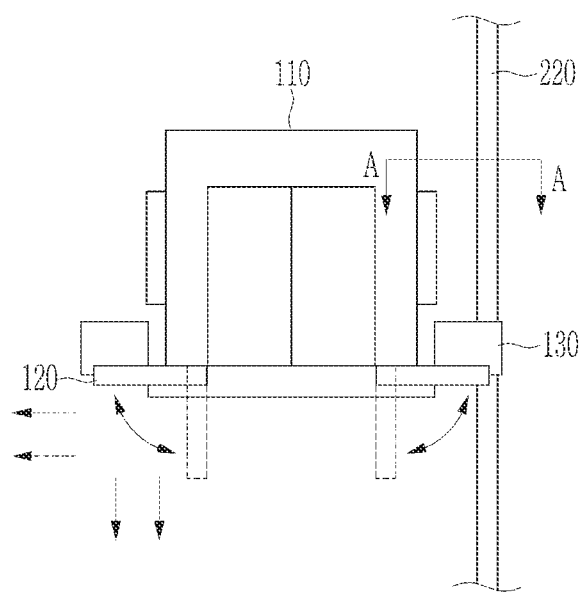
FIG. 4 is a diagram illustrating movement of an aerial vehicle in an inter-floor transport system according to one or more embodiments.
Figure 5:
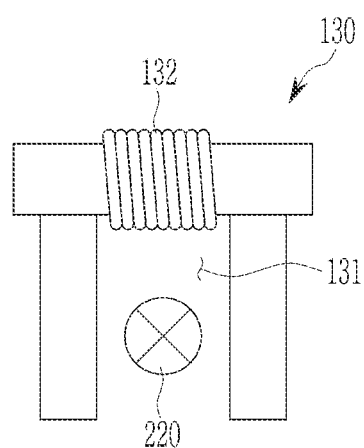
FIG. 5 is a cross-sectional view taken along line A-A of FIG. 4 according to one or more embodiments.

FIG. 3 is a diagram illustrating an aerial vehicle implemented in an inter-floor transport system according to one or more embodiments. FIG. 4 is a diagram illustrating movement of an aerial vehicle in an inter-floor transport system according to one or more embodiments. FIG. 5 is a cross-sectional view taken along line A-A of FIG. 4 according to one or more embodiments. In FIG. 3 to FIG. 5, components may be omitted and/or simplified for convenience of description.

Referring to FIG. 3, the aerial vehicle 100 may include a body 110, a driver 120, and a connection portion 130.

The body 110 may be a component to support the driver 120 and the connection portion 130. The body 110 may include the loading space 102 in an interior, and may have a box form. The body 110 is shown as having a hexahedral shape, but this is merely an example and may have various shapes such as a spherical body and a polyhedron. In addition, the body 110 may have a shape open in one direction so as to load or unload objects. In addition, a door capable of being opened and closed may be installed at the open portion of the body 110.

The driver 120 may be a component for providing a driving force to the body 110 for moving (e.g., flying) the aerial vehicle 100 vertically or horizontally. The driver 120 may be supported on a side of the body 110.

The driver 120 may include a plurality of vertical thrusters 121 configured to vertically move the body 110, and a plurality of horizontal thrusters 122 configured to horizontally move the body 110. For example, the plurality of vertical thrusters 121 may be supported on upper or lower portions of the body 110. The plurality of vertical thrusters 121 may generate thrusting force in the vertical direction (the Z-direction) of the body 110. In addition, the plurality of horizontal thrusters 122 may be supported on both lateral sides of the body 110. The plurality of horizontal thrusters 122 may generate thrusting force in the horizontal direction (X and Y-directions) of the body 110.

Referring to FIG. 4, the driver 120 may include a plurality of thrusters that may be tilted. As the driver 120 is tilted, the thrusting force may be generated in vertical and horizontal directions of the body 110.

The connection portion 130 may be a component configured to receive power through the guide cable 220 in the contactless manner. The connection portion 130 may be disposed on at least one side of the body 110, and be contactlessly engaged with the guide cable 220.

According to an embodiment, the connection portion 130 may be disposed on both sides of the body 110. When the aerial vehicle 100 vertically moves along the sub-passage 320 that extends vertically, the connection portion 130 may be engaged with the guide cable 220 in a contactless state, and receive power therefrom. In addition, when the aerial vehicle 100 horizontally moves along the connection passage 350 that extends horizontally (e.g., when the aerial vehicle moves from one sub-passage to another sub-passage), the connection portion 130 becomes spaced apart from the guide cable 220, and is thereby not capable of receiving power therefrom.

According to an embodiment, the aerial vehicle 100 may include the battery 160 configured to supply auxiliary power to the driver 120. Accordingly, the aerial vehicle 100 may receive power though the battery 160 provided in the aerial vehicle 100. According to an embodiment, the driver 120 may selectively receive power though the guide cable 220 or receive power though the battery 160. That is, the driver 120 may receive power when moving vertically through passages, and the driver 120 may receive power from the battery 160 when moving horizontally across passages.

Referring to FIG. 4 and FIG. 5, the connection portion 130 may be formed such that the guide cable 220 may pass through the connection portion 130. For example, the connection portion 130 may include a receiving recess 131 that at least partially surrounds the guide cable 220 without contacting the guide cable 220. That is, the guide cable 220 may pass through the connection portion 130 in the vertical direction, and the connection portion 130 may have an open side via the recess 131. For example, referring to FIG. 5, the connection portion 130 may have a "U"-shaped cross-section.

According to an embodiment, the connection portion 130 may receive power from the guide cable 220 based on electromagnetic induction (e.g., in an electromagnetic induction manner). The connection portion 130 may include an induction coil 132. Accordingly, the connection portion 130 may receive power from the guide cable 220 functioning as a power supply line, and supply power to the driver 120, based on electromagnetic induction via the guide cable 220. For example, the connection portion 130 provided on the aerial vehicle 100 may be positioned close to the guide cable 220 in the contactless manner. When alternating current flows through the guide cable 220, the aerial vehicle 100 may be supplied with the induced electromotive force generated in the connection portion 130 as electric power. Both ends of the guide cable 220 may be connected to a high-frequency power source (e.g., power supply, 240) to form a primary circuit, and a secondary circuit including the connection portion 130 may include a resonance circuit that resonates at the frequency of the alternating current flowing in the guide cable 220.

Figure 6:
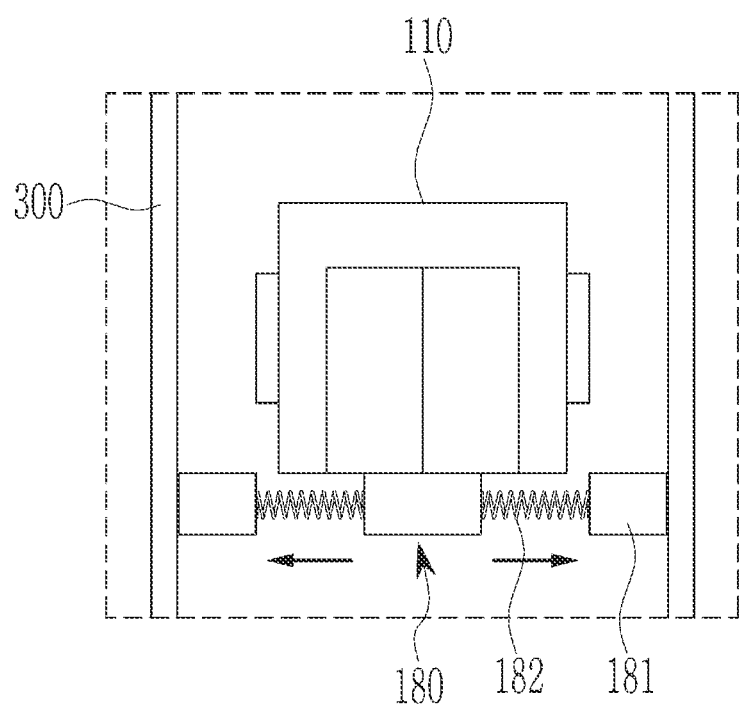
FIG. 6 is a diagram illustrating a braking assembly of an aerial vehicle in an inter-floor transport system according to one or more embodiments.

FIG. 6 is a diagram illustrating a braking assembly of an aerial vehicle in an inter-floor transport system according to one or more embodiments. According to an embodiment, the aerial vehicle 100 may further include a braking assembly 180.

The braking assembly 180 may be a component for fixing a position of the aerial vehicle 100 within the passage 300. Accordingly, the position of the aerial vehicle 100 may be fixed within the passage 300 by the braking assembly 180. In addition, the aerial vehicle 100 may be prevented from falling within the passage 300, by the braking assembly 180.

The braking assembly 180 may include a support member 181 that is configured to protrude from the body 110 and contact the interior wall of the passage 300 in order to stop movement of the aerial vehicle 100. The support member 181 may be configured to protrude and be fixed to the interior wall of the passage 300. For example, the support member 181 may pressurize the interior wall of the passage 300 by an elastic force of an elasticity member (e.g., biasing element 182). Alternatively, a separate fixing device may be provided to the support member 181 or the interior wall of the passage 300 such that the support member 181 may contact the interior wall of the passage 300 and/or be fixed to the interior wall of the passage 300.

Figure 8:
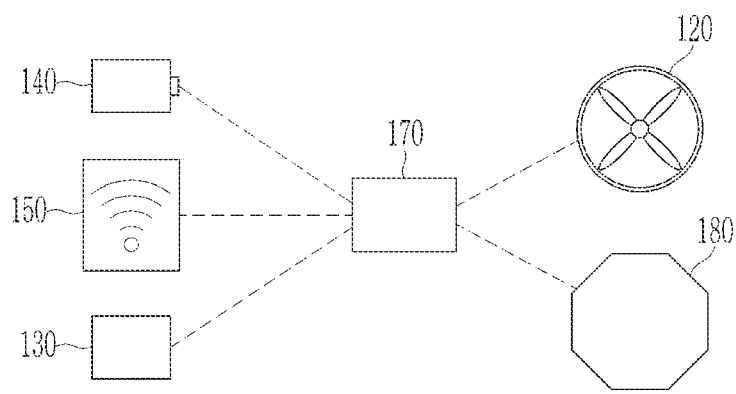
FIG. 8 is a diagram illustrating control an operation of an aerial vehicle according to an inter-floor transport system according to one or more embodiments.

According to an embodiment, the aerial vehicle 100 may further include a sensor 140 (FIG. 3 and FIG. 8) and a communicator 150 (FIG. 3 and FIG. 8). The aerial vehicle 100 moving (e.g., flying) along the passage 300 may require a mechanism for moving to a precise position. In addition, a plurality of aerial vehicles may move (e.g., fly) within the passage 300, and therefore, a mechanism for preventing collision between the plurality of aerial vehicles may be required. As an example, the sensor 140 and the communicator 150 may be provided in the aerial vehicle 100 to prevent collision between a plurality of aerial vehicles.

The sensor 140 may detect the position of the aerial vehicle 100. For example, the sensor 140 may be installed on the body 110, and may include various types of sensors such as a distance measurement sensor, a gyro sensor, an acceleration sensor. The sensor 140 may detect the position of the aerial vehicle 100 within the passage 300. In addition, the sensor 140 may detect a posture of the aerial vehicle 100. In addition, the sensor 140 may detect a distance to another aerial vehicle.

The communicator 150 may be a component for communicating with another aerial vehicle in a wireless manner. The communicator 150 may be provided in the body 110. When the plurality of aerial vehicles moves within the passage 300, the plurality of aerial vehicles may communicate position information with each other through the communicators 150 of the aerial vehicles. Accordingly, collision between the plurality of aerial vehicles may be prevented.

The aerial vehicle 100 may be connected to at least one of the driver 120, the connection portion 130, the sensor 140, the communicator 150, the battery 160, and the braking assembly 180, and may further include a controller 170 configured to control the operation of the aerial vehicle 100, for example, the operation of the driver 120 and the braking assembly 180. The controller 170 may be implemented by a processor and memory storing instructions that are executed by the processor.

Figure 7:
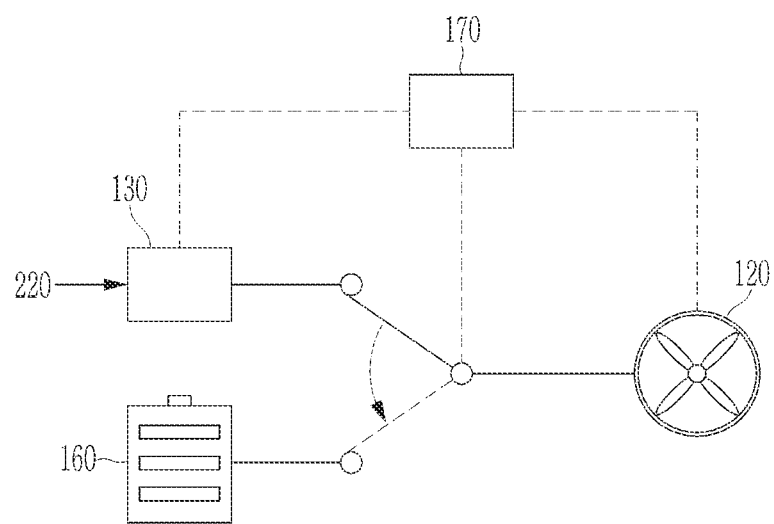
FIG. 7 is a diagram illustrating control an operation of an aerial vehicle according to an inter-floor transport system according to one or more embodiments.

FIG. 7 is a diagram illustrating control an operation of an aerial vehicle according to an inter-floor transport system according to one or more embodiments.

Referring to FIG. 7, the controller 170 may be connected to the driver 120 and the connection portion 130. According to an embodiment, the controller 170 may detect whether power is supplied from the connection portion 130, and control electrical connection between the battery 160 and the driver 120. For example, when the connection portion 130 receives (in a contactless manner) power though the guide cable 220, the driver 120 may be electrically connected to the connection portion 130, and thereby the driver 120 may receive power from the connection portion 130. For example, when the connection portion 130 does not receive power though the guide cable 220, the driver 120 may be electrically connected to the battery 160, such that the driver 120 may receive power from the battery 160. That is, the driver 120 may selectively receive power though the guide cable 220 or receive power though the battery 160.

FIG. 8 is a diagram illustrating control an operation of an aerial vehicle according to an inter-floor transport system according to one or more embodiments. Referring to FIG. 8, the controller 170 may be connected to at least one of the connection portion 130, the sensor 140, the communicator 150, the driver 120, and the braking assembly 180.

According to an embodiment, the controller 170 may be connected to the sensor 140 and the communicator 150, to control the operation of the driver 120. For example, the controller 170 may receive the position information of the aerial vehicle 100 from the sensor 140. When the aerial vehicle 100 is not located at a target position within the passage, the driver 120 may be driven to move to the target position. For example, the controller 170 may receive position information of another aerial vehicle from the communicator 150. When there is a possibility of collision between the aerial vehicle 100 and another aerial vehicle, the driver 120 may be driven to move the aerial vehicle 100 away from the other aerial vehicle.

According to an embodiment, the controller 170 may be connected to the sensor 140 and the communicator 150, to control the operation of the braking assembly 180. For example, the controller 170 may receive the position information of the aerial vehicle 100 from the sensor 140. When the aerial vehicle 100 has arrived at the target position within the passage, the braking assembly 180 may be activated to fix the position of the aerial vehicle 100 at the target position. For example, the controller 170 may receive the position information of another aerial vehicle from the communicator 150. When there is a possibility of collision of the aerial vehicle 100 with another aerial vehicle, the braking assembly 180 may be activated to fix the position of the aerial vehicle 100, preventing from approaching the other aerial vehicle.

According to an embodiment, the controller 170 may be connected to the connection portion 130, to control the operation of the braking assembly 180. For example, the controller 170 may detect whether power is supplied from the guide cable 220 to the connection portion 130. When the aerial vehicle 100 cannot receive power from the guide cable 220 through the connection portion 130, the braking assembly 180 may be activated to fix the position of the aerial vehicle 100, thereby preventing falling.

Hereinafter, variations of the power assembly 200 and the connection portion 130 are described.

Figure 9:
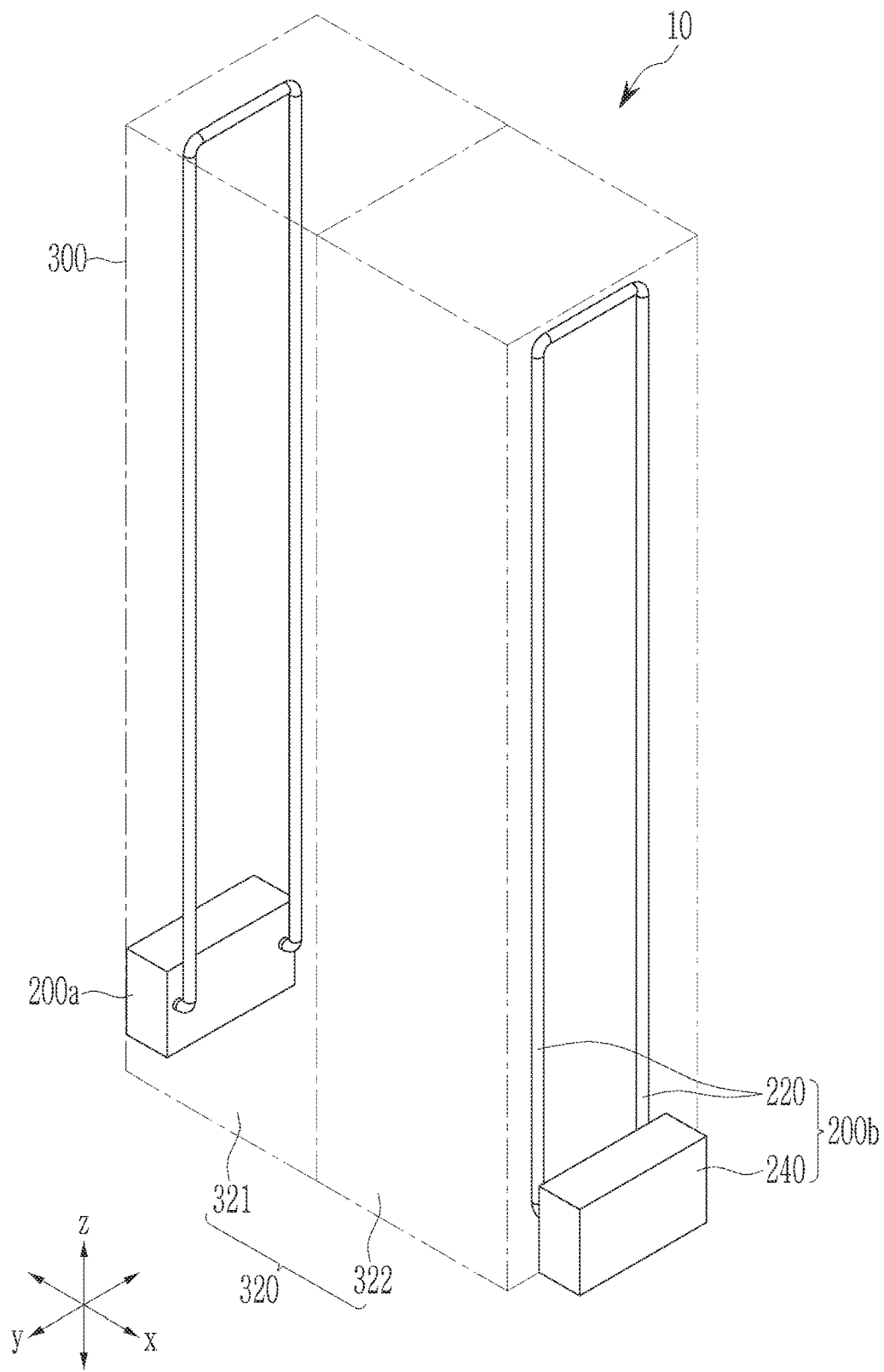
FIG. 9 is a diagram illustrating a power assembly in an inter-floor transport system according to one or more embodiments.
Figure 10:
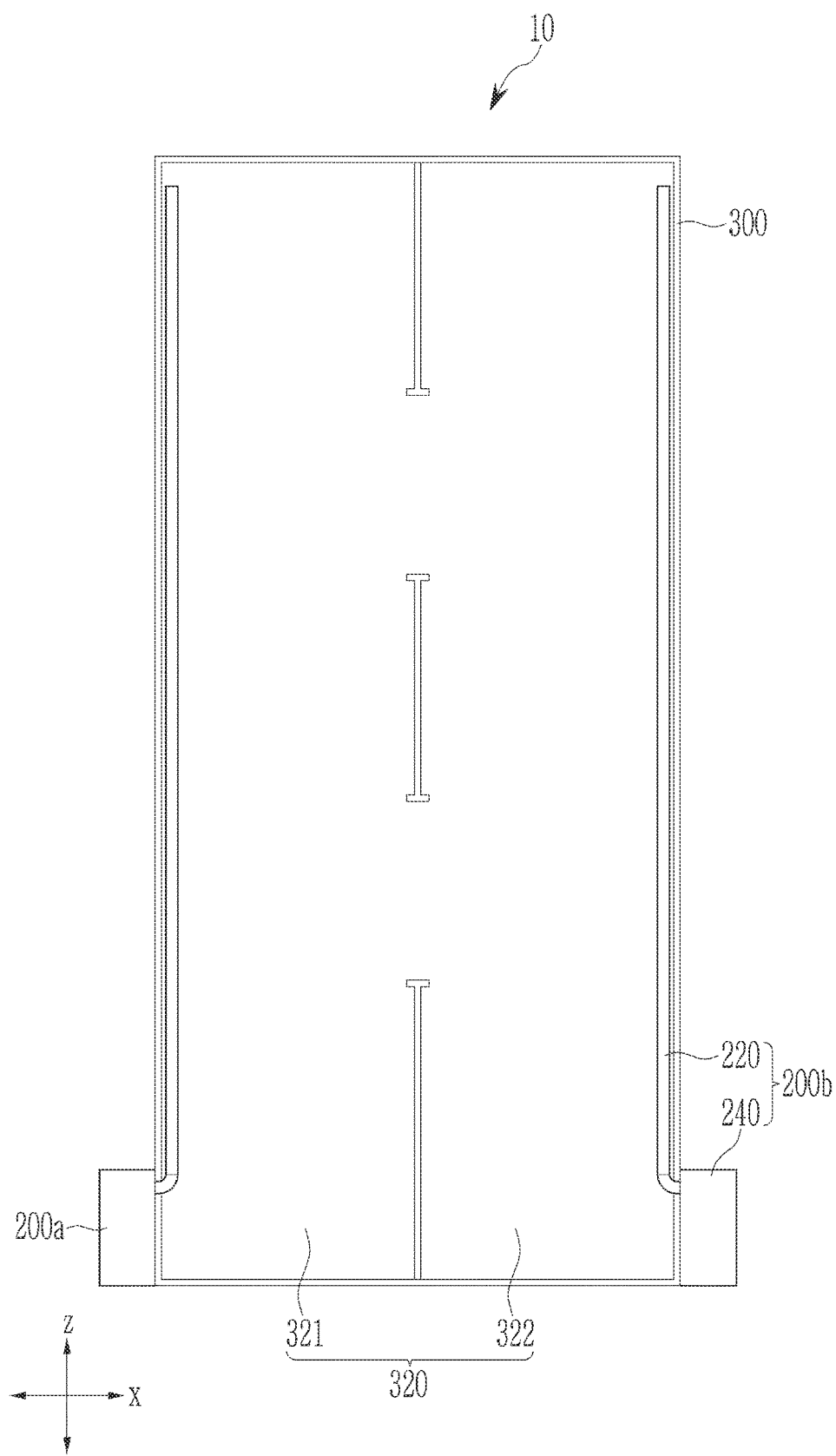
FIG. 10 is a diagram illustrating a power assembly in an inter-floor transport system according to one or more embodiments.

FIG. 9 is a diagram illustrating a power assembly in an inter-floor transport system according to one or more embodiments. FIG. 10 is a diagram illustrating a power assembly in an inter-floor transport system according to one or more embodiments.

Referring to FIG. 9 and FIG. 10, the power assembly 200 may be provided to respective sub-passages 321 and 322 of the plurality of sub-passages 320. For example, the first sub-passage 321 may be provided with the power assembly 200a, and the second sub-passage 322 may also be provided with the power assembly 200b.

For example, the power assembly 200a may include a corresponding power supply and a guide cable that may be installed on a side wall of the first sub-passage 321. In addition, the power assembly 200*b* may include a corresponding power supply 240 and a guide cable 220 that may also be installed on a side wall of the second sub-passage 322. Accordingly, only the guide cable is required to be installed on the side wall of respective sub-passages, and thus it is easy to install the equipment for supplying power to the aerial vehicle 100 that ascends and descends within respective sub-passages. The side wall of the sub-passage on which the guide cable is installed may be, among the four walls of the sub-passage, a side wall corresponding to the position of the connection portion 130 of the aerial vehicle 100 that vertically moves (e.g., flies) within the sub-passage.

The power assemblies 200*a* and 200*b* respectively provided in the sub-passages 321 and 322 may have the loop structure as both ends of the guide cable are connected to the power supply. For example, referring to FIG. 9, a guide cable may installed on the side walls of sub-passage 321, and a guide cable 220 may be installed on the side walls of sub-passage 322 . . . . Referring to guide cable 220, the guide cable 220 may be formed in a loop to the power supply 240, such that the guide cable 220 includes two portions that extend vertically along the side wall of the sub-passage 322.

Figure 11:
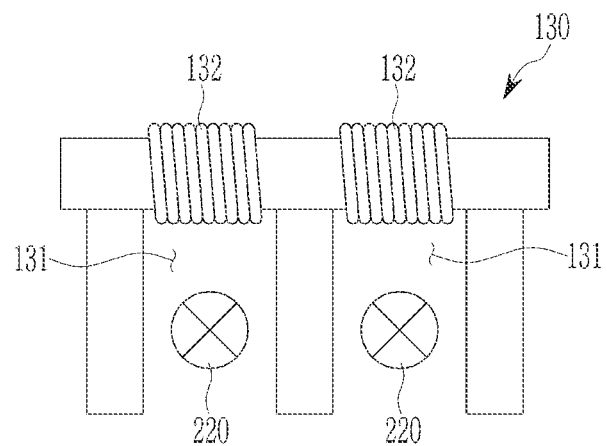
FIG. 11 is a diagram illustrating a connection portion according to one or more embodiments.

FIG. 11 is a diagram illustrating a connection portion according to one or more embodiments. Accordingly, referring to FIG. 11, the connection portion 130 of the aerial vehicle 100 may include two receiving recesses 131 in which the two guide cables 220 are accommodated (e.g., in the configuration of guide cable 220 in FIGS. 9 and 10). The aerial vehicle 100 may include two induction coils 132 which may be disposed at each of the two receiving recesses 131. The guide cable 220 may pass through each receiving recess 131 in contactless manner.

Hereinafter, another embodiment of the passage 300 is described with reference to the drawings.

Figure 12:
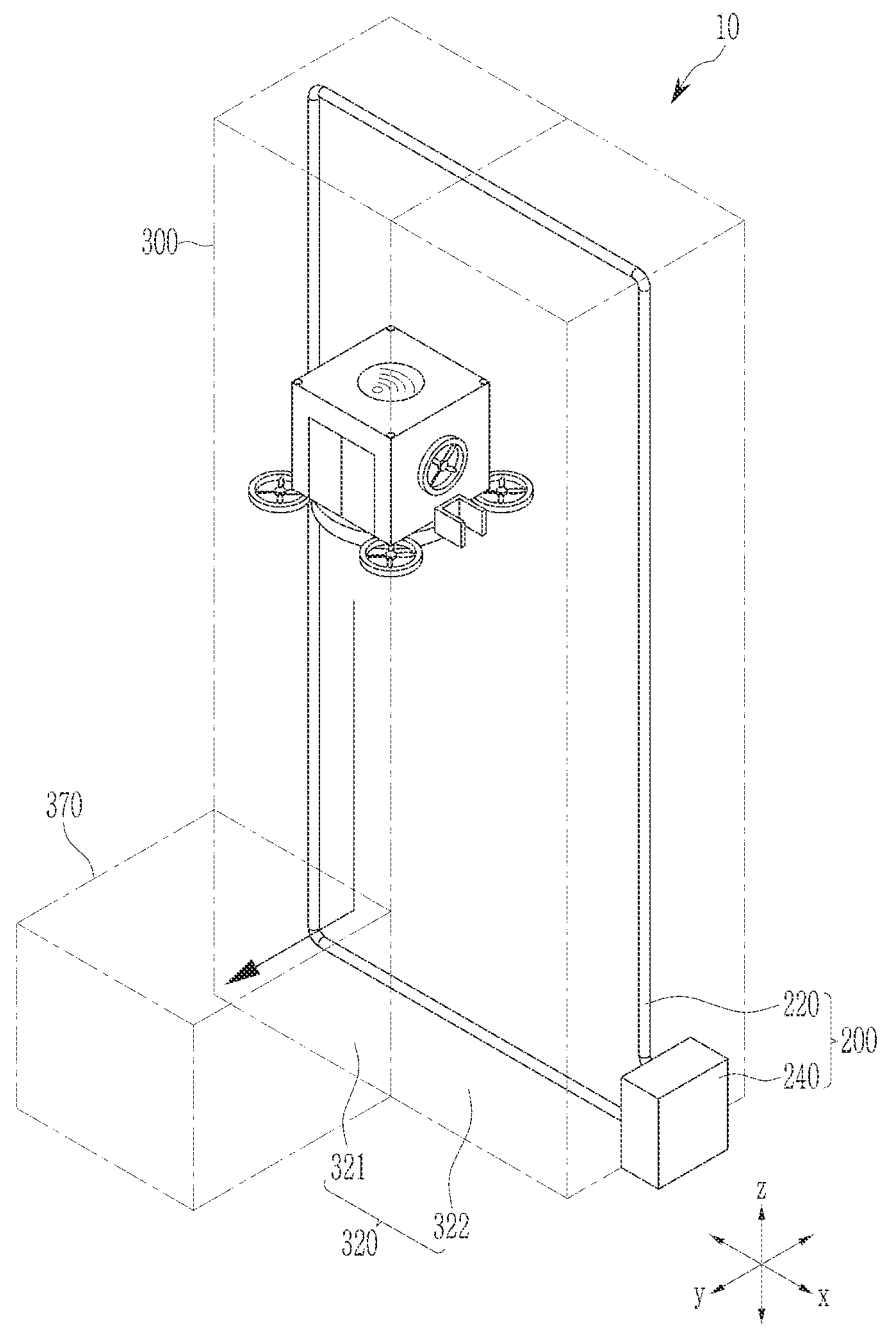
FIG. 12 is a diagram illustrating a passage in an inter-floor transport system according to one or more embodiments.

FIG. 12 is a diagram illustrating a passage in an inter-floor transport system according to one or more embodiments. Referring to FIG. 12, the passage 300 may include an auxiliary passage 370 that communicates with an outside. The auxiliary passage 370 may be a component for bringing the aerial vehicle 100 from the outside into the passage 300, and for taking the aerial vehicle 100 out of the passage 300 to the outside (e.g., loading the aerial vehicle into the passage 300 or unloading the aerial vehicle 100 out of the passage 300). Alternatively, the auxiliary passage 370 may be a space for the maintenance of the aerial vehicle 100.

According to an embodiment, the auxiliary passage 370 may be connected to one side of the sub-passage 320, to communicate with the sub-passage 320. FIG. 12 illustrates that a single auxiliary passage 370 is connected to a lower portion of the first sub-passage 321, but is not limited thereto. As an example, the auxiliary passage 370 may be connected to respective sub-passages. Alternatively, as another example, a plurality of auxiliary passages 370 may be connected to respective sub-passages at various locations.

Figure 13:
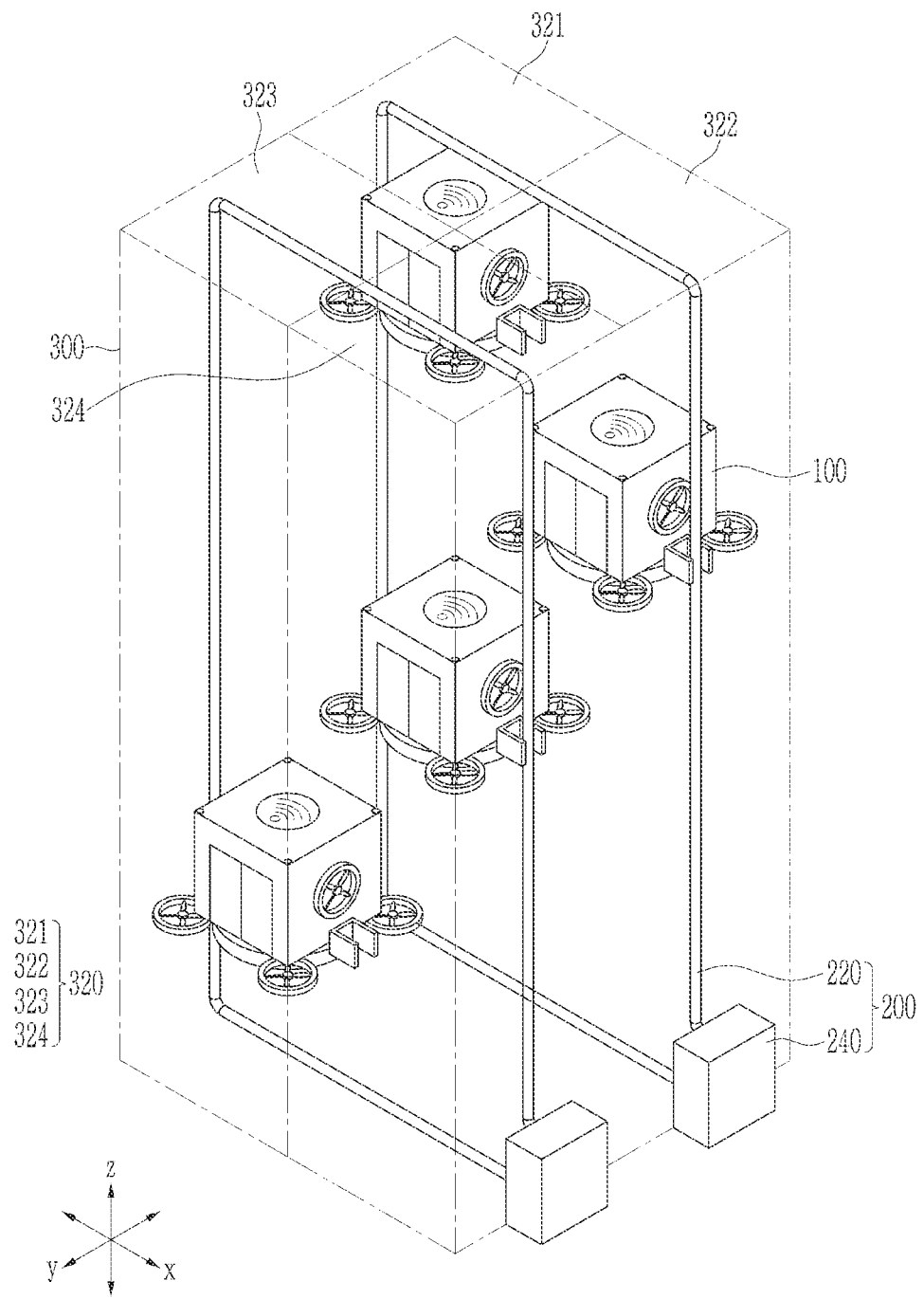
FIG. 13 is a diagram illustrating a passage in an inter-floor transport system according to one or more embodiments.

FIG. 13 is a diagram illustrating a passage in an inter-floor transport system according to one or more embodiments. Referring to FIG. 13, the passage 300 may include three or more sub-passages 320. According to an embodiment, the passage 300 may include four sub-passages 320. For example, the passage 300 may include first to fourth sub-passages 321, 322, 323, and 324. The first to fourth sub-passages 321, 322, 323, and 324 may be arranged in the form of a lattice in a plan view. Two or more sub-passages among first to fourth sub-passages 321, 322, 323, and 324 may communicate with each other through a connection passage. Accordingly, the aerial vehicle 100 ascending and descending within one sub-passage may move to another sub-passage.

According to an embodiment, two sub-passages among the four sub-passages may share the power assembly 200. For example, referring to FIG. 13, first and second sub-passages 321 and 322 may share a single power assembly 200. Accordingly, the guide cable 220 may extend over the first and second sub-passages 321 and 322. In addition, third and fourth sub-passages 323 and 324 may share a single power assembly. Accordingly, the guide cable corresponding to the power assembly of the sub-passages 323 and 324 may extend over the third and fourth sub-passages 323 and 324. However, the present disclosure is not limited thereto, and each sub-passage may have its own the power assembly. The power supply 240 and the guide cable 220 may be installed on a side wall of each sub-passage.

FIG. 13 illustrates that the passage 300 include four sub-passages 321, 322, 323, and 324 of a same height, but is not limited thereto. For example, four sub-passages may have four different heights, or at least one sub-passage may have a height different from the other sub-passages.

FIG. 13 illustrates that a single aerial vehicle 100 ascends and descends along each of the sub-passages 321, 322, 323, and 324, but is not limited thereto. For example, the aerial vehicle 100 may horizontally move from one sub-passage to another sub-passage, and a plurality of aerial vehicles may ascend and descend within one sub-passage. For another example, the number of the aerial vehicles may be larger than the number of the sub-passages 320. The plurality of aerial vehicles 100 may ascend and descend within one sub-passage.

As such, according to an inter-floor transport system according to embodiments, only the guide cable 220 for power supply to the aerial vehicle 100 in the contactless manner is employed within the passage 300, and therefore, the installation of the equipment for the inter-floor transport is easy. In addition, the maintenance is also easy because, at the time of failure of the aerial vehicle 100, the aerial vehicle 100 within the passage 300 may be recollected.

In addition, according to an inter-floor transport system according to embodiments, the guide cable 220 is extendable, and therefore, there is no limit on the maximum height of the inter-floor transport. Accordingly, cost competitiveness may be increased.

In addition, according to an inter-floor transport system according to embodiments, the power is supplied to aerial vehicle in the contactless manner, and accordingly, problems caused by dust or particles in the contact manner may be prevented.

According to an embodiment, installation becomes easy because only the cable for the contactless power supply to aerial vehicle is employed in the passage for the inter-floor transport.

In addition, the cable for the contactless power supply is extendable, and therefore, there is no limit on the maximum height of the inter-floor transport, thereby enhancing cost competitiveness.

In addition, the power is supplied to aerial vehicle in the contactless manner, and accordingly, problems caused by dust or particles in the contact manner may be prevented.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. An inter-floor transport system comprising:
an aerial vehicle configured to move vertically and horizontally along a passage; and
a power assembly comprising:
a power supply adjacent to the passage; and
a guide cable extending along the passage and connected to the power supply,
wherein the aerial vehicle is configured to receive power through the guide cable without contacting the guide cable, and
wherein the aerial vehicle comprises:
a body; and
at least one connection portion on at least one side of the body, the at least one connection portion partially surrounding the guide cable and being configured to contactlessly engage with the guide cable and receive power though the guide cable when contactlessly engaged with the guide cable.

2. The inter-floor transport system of claim 1, wherein the body comprises a loading space, and
wherein the aerial vehicle further comprises:
a driver configured to move the body vertically and horizontally.

3. The inter-floor transport system of claim 2, wherein each of the at least one connection portion comprises a recess through which the guide cable passes, the recess being configured to at least partially surround the guide cable without contacting the guide cable.

4. The inter-floor transport system of claim 2, wherein each of the at least one connection portion comprises an induction coil and is configured to:
receive power from the guide cable through the induction coil based on electromagnetic induction; and
supply power to the driver.

5. The inter-floor transport system of claim 2, wherein the driver comprises:
a plurality of vertical thrusters configured to move the body vertically; and
a plurality of horizontal thrusters configured to move the body horizontally.

6. The inter-floor transport system of claim 2, wherein the driver comprises a plurality of thrusters configured to tilt to move the body vertically and horizontally.

7. The inter-floor transport system of claim 2, wherein the aerial vehicle further comprises:
a sensor configured to detect a position of the aerial vehicle;
a communicator configured to communicate with another aerial vehicle;
a battery configured to supply auxiliary power to the driver; and
a controller operatively connected to the at least one connection portion, the sensor and the communicator, and configured to control an operation of the driver.

8. The inter-floor transport system of claim 7, wherein the controller is further configured to:
detect whether power is supplied from the at least one connection portion, and
control an electrical connection between the battery and the driver.

9. The inter-floor transport system of claim 2, wherein the aerial vehicle further comprises a braking assembly configured to fix a position of the aerial vehicle within the passage, and
wherein the braking assembly comprises a support member configured to protrude from the body and contact to an interior wall of the passage.

10. The inter-floor transport system of claim 1, wherein the passage comprises a plurality of sub-passages extending vertically and connected to each other, and
wherein the guide cable extends along each of the plurality of sub-passages.

11. The inter-floor transport system of claim 10, wherein the guide cable is provided in a side wall of each of the plurality of sub-passages.

12. The inter-floor transport system of claim 1, wherein the guide cable comprises a first end and a second end, and
wherein both the first end and the second end of the guide cable are connected to the power supply.

13. An inter-floor transport system comprising:
a passage comprising a plurality of sub-passages extending vertically and being connected to each other;
at least one aerial vehicle configured to move vertically and horizontally along the passage; and
a power assembly comprising:
a power supply adjacent to the passage, and
a guide cable extending along each of the plurality of sub-passages and connected to the power supply,
wherein the at least one aerial vehicle is configured to receive power through the guide cable without contacting the guide cable, and
wherein the at least one aerial vehicle comprises:
a body; and
at least one connection portion on at least one side of the body, the at least one connection portion partially surrounding the guide cable and being configured to contactlessly engage with the guide cable and receive power though the guide cable when contactlessly engaged with the guide cable.

14. The inter-floor transport system of claim 13, wherein the body comprises a loading space,
wherein each of the at least one aerial vehicle each comprises:
a driver configured to move the body vertically and horizontally; and
a battery configured to supply auxiliary power to the driver;
wherein the at least one connection portion is configured to receive power though the guide cable and supply power to the driver, and
wherein the driver is configured to receive power though the guide cable or though the battery.

15. The inter-floor transport system of claim 14, wherein each of the at least one aerial vehicle comprises:
a sensor configured to detect a position;
a communicator configured to communicate with another aerial vehicle;
a braking assembly configured to fix a position of the at least one aerial vehicle within the passage; and
a controller operatively connected to the at least one connection portion, the sensor, the communicator, and the braking assembly, and configured to control an operation of the driver and the braking assembly.

16. The inter-floor transport system of claim 14, wherein each of the at least one aerial vehicle is configured to use power received from the guide cable to ascend and descend within a corresponding sub-passage of the plurality of sub-passages.

17. The inter-floor transport system of claim 14, wherein each of the at least one aerial vehicle is configured to use power received from the battery to horizontally move from one sub-passage to another sub-passage of the plurality of sub-passages.

18. The inter-floor transport system of claim 13, wherein the passage further comprises a connection passage extending horizontally and configured to interconnect corresponding sub-passages of the plurality of sub-passages.

19. The inter-floor transport system of claim 13, wherein the passage further comprises an auxiliary passage communicating with an outside and configured to load and unload the at least one aerial vehicle.

20. An inter-floor transport system comprising:
   a passage comprising:
      a pair of sub-passages that extend vertically and are adjacent to each other; and
      a connection passage extending horizontally and interconnecting the pair of sub-passages;
   a power assembly comprising:
      a power supply connected to an external power source and disposed adjacent to the passage; and
      a guide cable connected to the power supply and extending along each of the pair of sub-passages; and
   at least one aerial vehicle comprising:
      a body comprising a loading space,
      a driver configured to move the body vertically and horizontally,
      a connection portion on a side of the body, the connection portion partially surrounding the guide cable and being configured to:
         contactlessly engage with the guide cable;
         receive power though the guide cable; and
         supply power to the driver; and
      a battery configured to supply auxiliary power to the driver,
   wherein the at least one aerial vehicle is configured to:
      ascend and descend along a sub-passage of the pair of sub-passages using power received from the guide cable; and
      move between the pair of sub-passages using power received from the battery.

* * * * *